United States Patent
Usui et al.

(10) Patent No.: US 10,019,375 B2
(45) Date of Patent: Jul. 10, 2018

(54) CACHE DEVICE AND SEMICONDUCTOR DEVICE INCLUDING A TAG MEMORY STORING ABSENCE, COMPRESSION AND WRITE STATE INFORMATION

(71) Applicant: TOSHIBA MEMORY CORPORATION, Minato-ku, Tokyo (JP)

(72) Inventors: Hiroyuki Usui, Kawasaki Kanagawa (JP); Seiji Maeda, Kawasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

(21) Appl. No.: 15/269,930

(22) Filed: Sep. 19, 2016

(65) Prior Publication Data

US 2017/0255562 A1    Sep. 7, 2017

Related U.S. Application Data

(60) Provisional application No. 62/302,479, filed on Mar. 2, 2016.

(51) Int. Cl.
| G06F 12/0895 | (2016.01) |
| G06F 12/0864 | (2016.01) |
| G06F 12/084 | (2016.01) |
| G06F 12/0811 | (2016.01) |
| G06F 12/0842 | (2016.01) |
| G06F 12/0886 | (2016.01) |
| G06F 12/121 | (2016.01) |

(52) U.S. Cl.
CPC ........ *G06F 12/0895* (2013.01); *G06F 12/084* (2013.01); *G06F 12/0811* (2013.01); (Continued)

(58) Field of Classification Search
CPC ............. G06F 12/0895; G06F 12/0811; G06F 12/084; G06F 12/0842; G06F 12/0864; (Continued)

(56) References Cited

U.S. PATENT DOCUMENTS 5,155,824 A * 10/1992 Edenfield ............ G06F 12/0804
                                                    711/143
6,640,283 B2   10/2003 Naffziger et al.
(Continued)

FOREIGN PATENT DOCUMENTS

WO    WO 2015/125971    *  8/2015

*Primary Examiner* — Glenn Gossage
(74) *Attorney, Agent, or Firm* — Holtz, Holtz & Volek PC

(57) ABSTRACT

A cache device has a data memory capable of storing a piece of first cache line data and a piece of second cache line data for first and second ways in compressed form, and a tag memory configured to store, for each of the pieces of cache line data, a piece of tag data including uncompressed data writing state information, an absence flag, and a compression information field. In case of modifying only part of a cache line, i.e., a partial write, a request converter converts a write request into a read request, and a read-out piece of data is decompressed and written in a write status buffer. Data may be written from the write status buffer to the data memory without being compressed, which eliminates a need for decompression and compression for every writing or modifying operation of a piece of partial data, thereby reducing latency and power consumption.

18 Claims, 11 Drawing Sheets

(52) U.S. Cl.
CPC ...... *G06F 12/0842* (2013.01); *G06F 12/0864* (2013.01); *G06F 12/0886* (2013.01); *G06F 12/121* (2013.01); *G06F 2212/1016* (2013.01); *G06F 2212/1024* (2013.01); *G06F 2212/1028* (2013.01); *G06F 2212/401* (2013.01); *G06F 2212/6042* (2013.01)

(58) Field of Classification Search
CPC ..... G06F 2212/1016; G06F 2212/1028; G06F 2212/401; G06F 2212/6042; G06F 12/0886; G06F 12/121; G06F 2212/1024
See application file for complete search history.

(56) References Cited

U.S. PATENT DOCUMENTS

| | | | |
|---|---|---|---|
| 6,868,485 B1* | 3/2005 | Conway | G06F 12/082 709/218 |
| 7,143,238 B2* | 11/2006 | Adl-Tabatabai | G06F 12/0886 710/68 |
| 7,711,902 B2* | 5/2010 | Pong | G06F 12/0846 711/122 |
| 7,769,729 B2 | 8/2010 | Faerber et al. | |
| 8,037,252 B2* | 10/2011 | Toussi | G06F 12/0817 711/135 |
| 8,326,810 B2 | 12/2012 | Faerber et al. | |
| 8,392,667 B2 | 3/2013 | Duncan et al. | |
| 2004/0015660 A1* | 1/2004 | Benveniste | G06F 12/0864 711/134 |
| 2006/0047916 A1* | 3/2006 | Ying | G06F 12/0802 711/144 |
| 2009/0063777 A1* | 3/2009 | Usui | G06F 12/0862 711/137 |
| 2013/0073530 A1 | 3/2013 | Faerber et al. | |
| 2016/0357683 A1* | 12/2016 | Takeda | G06F 12/1009 |
| 2017/0255561 A1* | 9/2017 | Alameldeen | G06F 12/0864 |

* cited by examiner

CACHE DEVICE AND SEMICONDUCTOR DEVICE INCLUDING A TAG MEMORY STORING ABSENCE, COMPRESSION AND WRITE STATE INFORMATION

FIELD

An embodiment described herein relates generally to a cache device and a semiconductor device.

BACKGROUND

A processing speed of a processor (e.g., a central processing unit (CPU)) or a hardware engine (HWE) is generally greater than a data supply speed of a main memory, such as a dynamic random-access memory (DRAM). A cache memory may be used to make up a difference in performance.

A cache memory temporarily holds a piece of data on a main memory in a static random access memory (SRAM) or the like that is higher in speed than the main memory.

In the absence of a cache memory, a processor acquires a piece of data of per-access data size (e.g., 4 bytes) from a main memory. (The "per-access data size" is also referred to below as a "data size for access.") In the presence of a cache memory, if a data array of the cache memory has no data, the cache memory acquires a piece of data from a main memory in units of cache line size (e.g., 256 bytes), which is larger than the data size for access.

If a demanded piece of data is present in a cache memory, the cache memory can return the piece of data from the cache memory to a processor without acquiring the piece of data from a main memory. For this reason, a processor or a hardware engine can access the data at high speed.

The capacity of a cache memory which can be integrated is limited. Accordingly, storage of data in compressed form has been proposed. A cache memory is manipulated in units of cache line size. A cache memory which stores data in compressed form decompresses a compressed cache line including a demanded piece of data and returns the demanded piece of data in the cache line to a processor.

As described above, a data size for access by a processor is smaller than a cache line size of a cache memory. To modify a piece of data of a whole cache line, writing is performed in a plurality of batches. For example, if a data size for access by a processor is 8 bytes, and a cache line size of a cache memory is 256 bytes, writing of a piece of 8-byte data is performed 32 times.

In the case of a cache memory which stores data in compressed form, to modify only a piece of data of part of an already-compressed cache line, the following decompression and compression processing of the whole cache line is necessary:
1) decompression of the whole target cache line;
2) writing of a piece of data in a target region in the target cache line; and
3) compression of the whole target cache line.
For this reason, to modify a piece of data of a cache line, decompression and compression processing of the whole cache line is performed for every data writing operation. In the example described earlier, decompression and compression processing of a cache line is performed for each of the 32 writing operations.

Thus, in the case of such a related-art cache memory, latency involved in decompression and compression processing of a cache line and power consumption of the cache memory are problems.

DETAILED DESCRIPTION

A cache device of an embodiment has a data memory capable of storing a piece of first cache line data and a piece of second cache line data for first and second ways in compressed form and a tag memory configured to store, for each of the pieces of cache line data, a piece of tag data including a piece of uncompressed data writing state information, a piece of absence information, and a piece of compression information.

The present embodiment will be described below with reference to the drawings.
(System Configuration)

Figure 1:
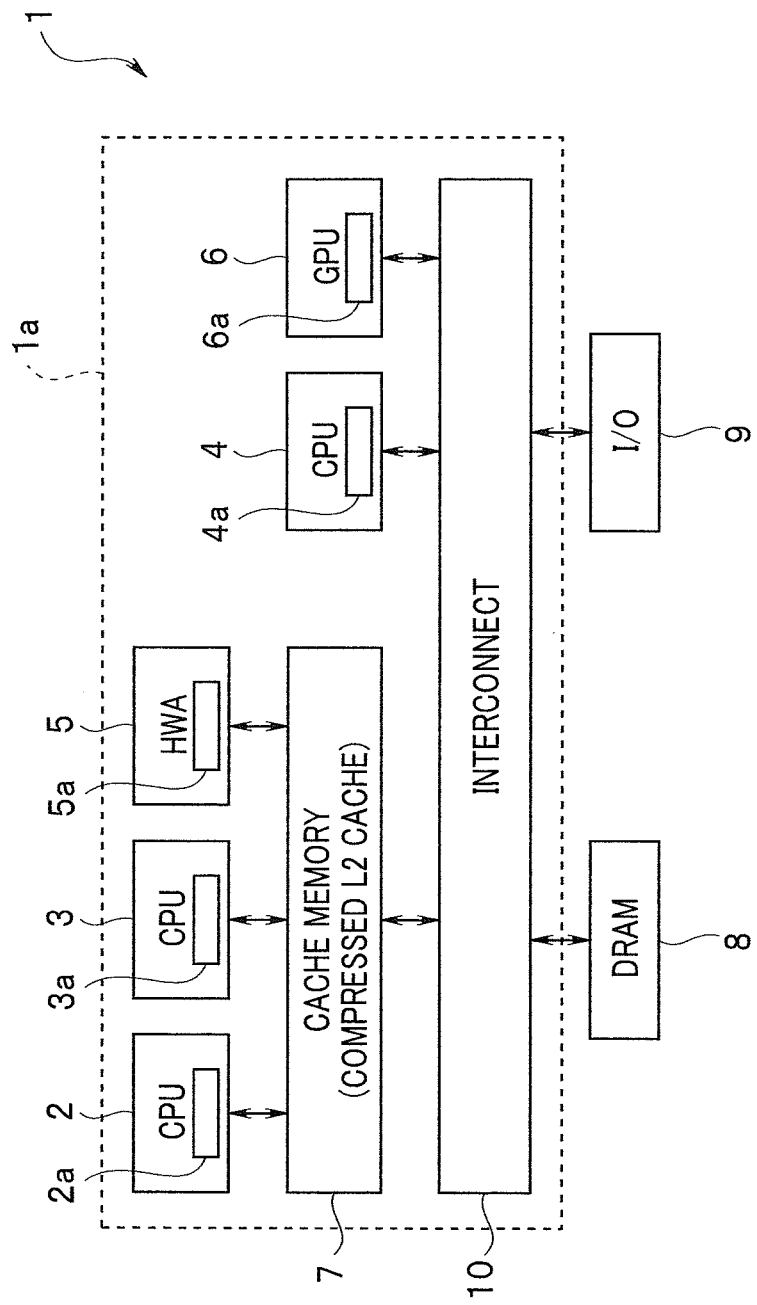
FIG. 1 is a block diagram showing an overall configuration of a computer system using a cache device according to an embodiment.

FIG. 1 is a block diagram showing an overall configuration of a computer system using a cache device according to an embodiment.

A computer system 1 is configured to include a plurality of central processing units (hereinafter abbreviated as CPUs) 2, 3, and 4, a hardware accelerator (hereinafter abbreviated as HWA) 5, a graphics processing unit (hereinafter abbreviated as GPU) 6, a cache memory 7, a dynamic random-access memory (hereinafter abbreviated as DRAM) 8, an input/output interface (hereinafter abbreviated as I/O) 9, and an interconnect 10.

The CPU 2, the CPU 3, and the HWA 5 are master devices that share the cache memory 7, which is a cache device. The cache memory 7 is connected to the interconnect 10, such as a bus. The DRAM 8 and the I/O 9 are also connected to the interconnect 10. The cache memory 7 exchanges data with the DRAM 8 that is a main memory via the interconnect 10.

The CPU 4 and the GPU 6 are directly connected to the interconnect 10 and exchange data with the DRAM 8 as the main memory via the interconnect 10. For example, a range indicated by a dotted line in FIG. 1 is configured as a one-chip semiconductor device 1a.

The cache memory 7 as the shared cache is a cache device which retains a compressed piece of data. Thus, the cache memory 7 has a circuit inside which compresses and decompresses data. The CPUs 2, 3, and 4, the HWA 5, and the GPU 6 incorporate respective dedicated L1 cache memories 2a, 3a, 4a, 5a, and 6a.

The computer system 1 is equipped with a cache coherency system for maintaining data consistency between a main memory and a cache memory.

In the present embodiment, the CPUs 2, 3, and 4, the HWA 5, and the GPU 6 will each be described as having a 64-byte L1 cache memory, and the cache memory 7 will be described as having an L2 cache memory. Note that all of the CPUs 2, 3, and 4, the HWA 5, and the GPU 6 may have no L1 cache memory and that the cache memory 7 may be an L1 cache memory.

(Configuration of Compressed Cache)

Figure 2:
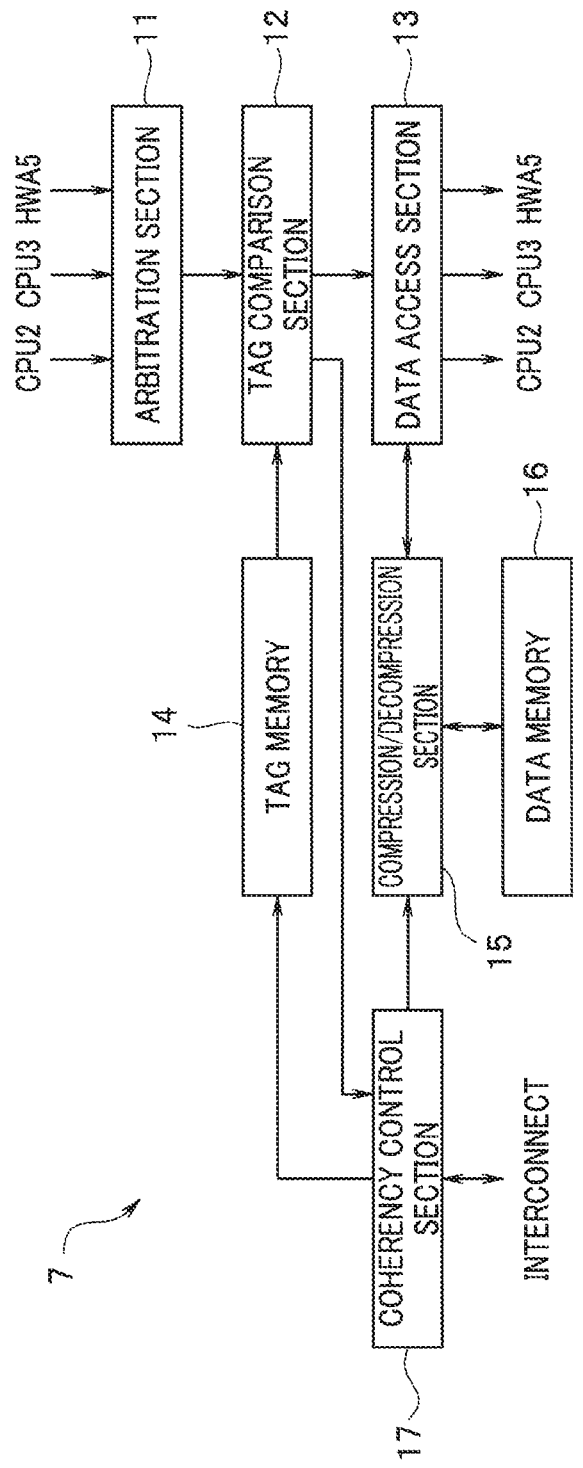
FIG. 2 is a block diagram showing a schematic configuration of a cache memory, which is a compressed cache, according to an embodiment.

FIG. 2 is a block diagram showing a schematic configuration of the cache memory 7 that is a compressed cache. The cache memory 7 is configured to include an arbitration section 11, a tag comparison section 12, a data access section 13, a tag memory 14, a compression/decompression section 15, a data memory 16, and a coherency control section 17.

The arbitration section 11 selects one from among requests from the CPUs 2 and 3 and the HWA 5 as request sources and supplies the selected request to the tag comparison section 12.

The tag comparison section 12 is a circuit which compares a piece of data associated with a request with a piece of tag data read out from the tag memory 14 and judges whether a cache miss or a cache hit has occurred.

The data access section 13 is a circuit which, if the tag comparison section 12 judges that a cache hit has occurred, acquires a piece of data from the data memory 16 and returns the piece of data to a request source in the case of a read request, and writes a piece of data in the data memory 16 in the case of a write request, via the compression/decompression section 15.

The tag memory 14 stores a piece of tag data for a piece of cache line data.

The compression/decompression section 15 includes a compressor and a decompressor. The compression/decompression section 15 compresses a piece of data by the compressor and writes the compressed piece of data in the data memory 16 in the case of a write request, and decompresses a piece of data read out from the data memory 16 by the decompressor and outputs the decompressed piece of data to the data access section 13 in the case of a read request.

The data memory 16 stores a piece of cache line data.

The coherency control section 17 includes a snoop circuit for maintaining data consistency between cache memories in the computer system 1 (FIG. 1) and between each cache memory and the DRAM 8.

If the tag comparison section 12 judges that a cache hit has occurred, the data access section 13 accesses the data memory 16.

In the case of a read request, since a read-out piece of data is compressed, the read-out piece of data is decompressed to a piece of original data by the decompressor of the compression/decompression section 15. The piece of original data after the decompression is returned to any one of the CPUs 2 and 3 and the HWA 5 as a data request source by the data access section 13.

In the case of a write request, a piece of cache line data as a writing target is read out, the read-out piece of data is decompressed to a piece of original data by the decompressor of the compression/decompression section 15, and writing is performed on the piece of original data after the decompression.

If the tag comparison section 12 judges that a cache miss has occurred, the coherency control section 17 accesses master devices via the interconnect 10. The coherency control section 17 reads out a demanded piece of data from the cache memory 4a of the CPU 4 or the cache memory 6a of the GPU 6, or the DRAM 8. The read-out piece of data is compressed by the compressor of the compression/decompression section 15 and is written in the data memory 16.

If eviction of a piece of cache line data already retained in the data memory 16 is necessary at the time of the writing, the coherency control section 17 reads out a piece of data to be evicted from the data memory 16. The read-out piece of data is decompressed to a piece of original data by the decompressor of the compression/decompression section 15 and is written onto the DRAM 8 via the interconnect 10. Simultaneously, a piece of tag data in the tag memory 14 is updated.

Figure 3:
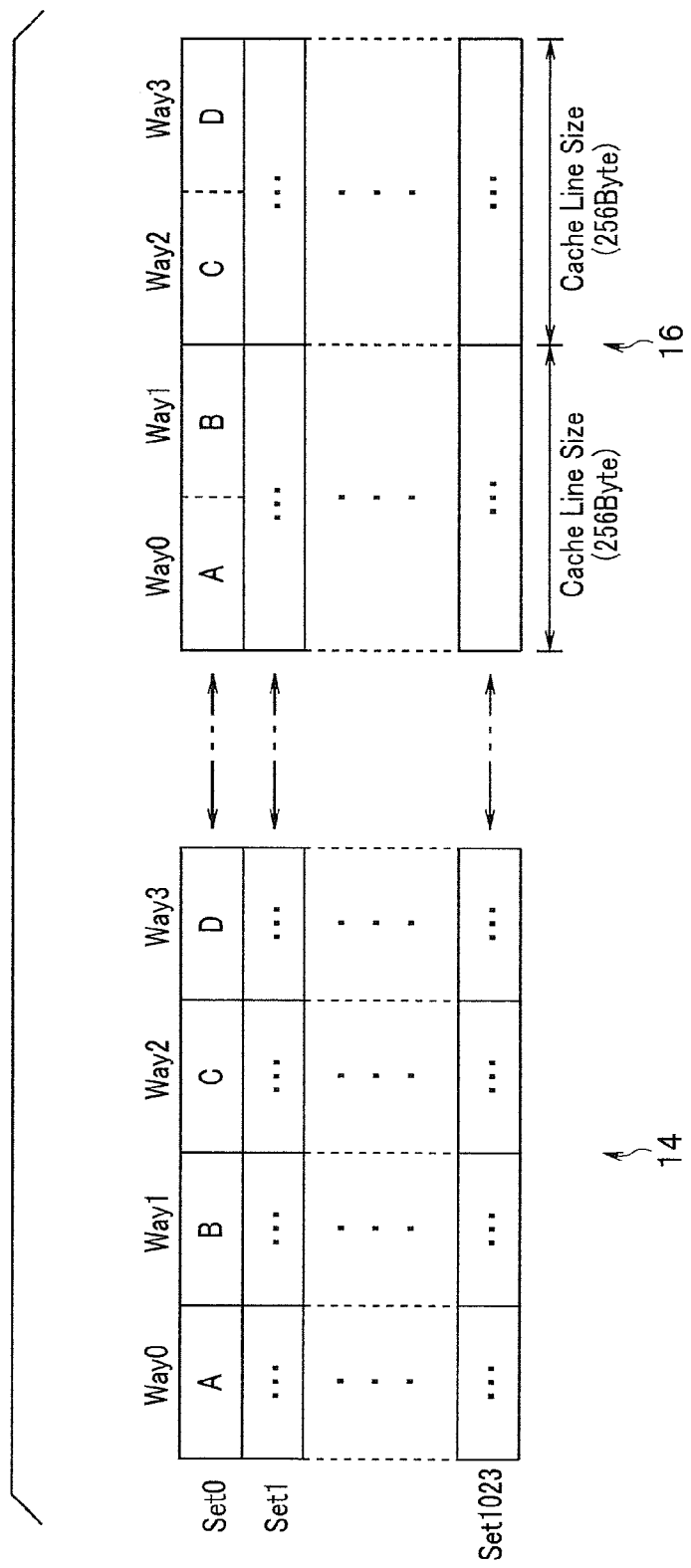
FIG. 3 is a chart showing data structures of a tag memory and a data memory of the cache memory, according to an embodiment.

FIG. 3 is a chart showing data structures of the tag memory 14 and the data memory 16 of the cache memory 7. The cache memory 7 is, for example, a 4-way set associative compressed cache and can store a plurality of sets of pieces of data. Note that, in the description of the present embodiment, a data compression ratio is 2:1, i.e., 50%.

For example, if the size of one cache line is 256 bytes, and the data memory 16 can store pieces of compressed data for 4 ways (Way0 to Way3), as shown in FIG. 3, the data memory 16 has a capacity of 512 kilobytes (KB).

One set is composed of data storage regions (512 bytes) for storing pieces of compressed data for the 4 ways (Way0 to Way3) in the data memory 16 and tag storage regions for the 4 ways in the tag memory 14. If the cache memory 7 is an uncompressed cache, the data memory 16 has data storage regions (1,024 bytes) for the 4 ways for storing pieces of uncompressed data. Here, the data memory 16 has the data storage regions having a half total size (512 bytes) for the 4 ways for storing pieces of compressed data.

The data memory 16 has data storage regions (for 2 ways here) per set. The number of data storage regions is obtained by multiplying a number n (n is an integer not less than 2) (the number of ways) by the compression ratio. The tag memory 14 has tag storage regions for the n ways (for 4 ways here).

Four already-compressed pieces of cache line data are stored in the data memory 16 for each set. Since the compression ratio is 2:1 here, the cache memory 7 can store pieces of data for 4,096 lines in the data memory 16 for 512 kilobytes (capacity is 1 MB if each piece of data is uncompressed).

Figure 4:
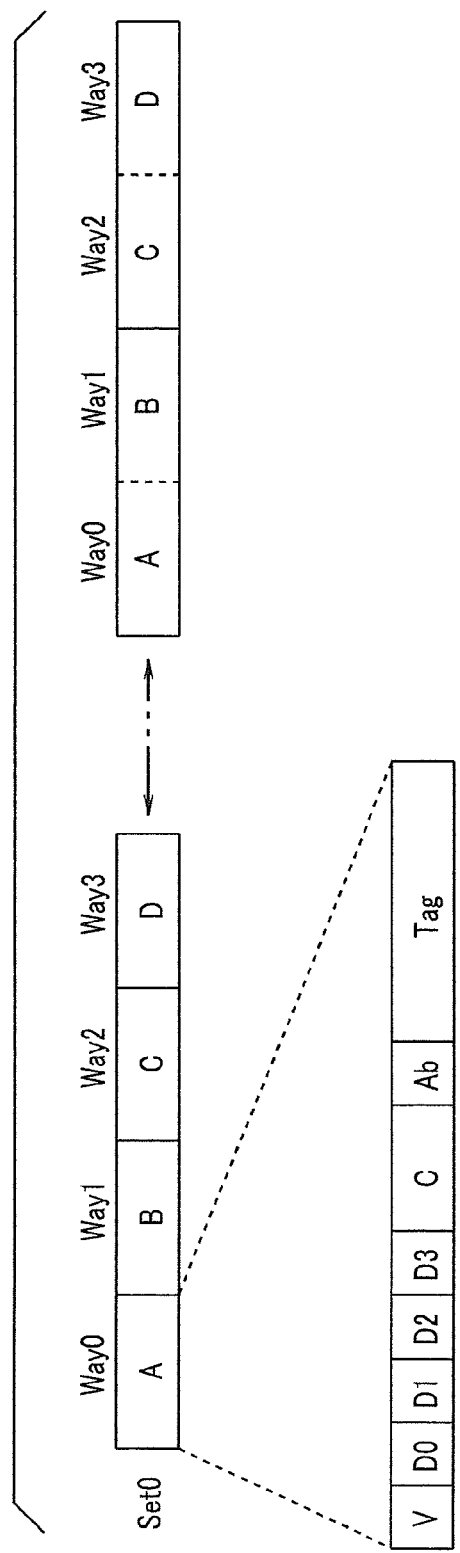
FIG. 4 is a chart showing a data configuration of the tag memory according to an embodiment.

FIG. 4 is a chart showing a data configuration of the tag memory 14. Note that in FIG. 4, pieces of tag data are shown on the left and pieces of cache line data are shown on the right. By way of example, FIG. 4 shows that four already-compressed pieces A, B, C, and D of cache line data are stored in the data storage regions corresponding to one set in the data memory 16, Set0 here. Pieces A, B, C, and D of cache line data are pieces of data corresponding to Way0, Way1, Way2, and Way3, respectively, of Set0. Tag data A, tag data B, tag data C, and tag data D for cache line data A to cache line data D are stored in tag storage regions corresponding to Set0 of the tag memory 14.

A piece of tag data includes a plurality of state flags indicating various states, a compression information field C (Compress), an absence flag Ab (Absence) indicating whether a piece of cache line data is present, and a piece of tag information (Tag).

The state flags are a plurality of bits of data which include a flag V (Valid) indicating whether a cache line in question is valid, and a plurality of flags D0, D1, D2, and D3 indicating that a piece of cache line data is present only in the cache memory 7 and that a piece of cache line data as a piece of uncompressed data is already written. The flag V is one bit of data.

The flags D0, D1, D2, and D3 are a plurality of bits (4 bits here) of data. The flags D0, D1, D2, and D3 are provided for respective units of 64 bytes of the piece of cache line data. That is, each of the flags D0, D1, D2, and D3 are provided not for respective cache lines but for respective units of 64 bytes, which is size of a piece of cache line data for an L1 cache. The flags D0, D1, D2, and D3 are four bits D0 to D3 of data.

In the present example, a dirty bit indicating whether or not the corresponding cache line data has been modified is utilized as each of the plurality of flags D0, D1, D2, and D3 indicating that a piece of cache line data as a piece of uncompressed data is already written.

Hereinafter, the four flags D0, D1, D2, and D3 will be collectively referred to as flags D, and an arbitrary one of the four flags D0, D1, D2, and D3 will be referred to as a flag D.

The compression information field C is one bit of data indicating whether the piece of cache line data is compressed or uncompressed. Alternatively, if a plurality of compression methods are available to be selected, the compression information field C may be a plurality of bits of data indicating a selected compression method.

The absence flag Ab is one bit of data indicating that the piece of tag information (Tag) is valid but the piece of cache line data in question is not present on the data memory 16.

The piece of tag information (Tag) is a piece of data of a tag portion for the corresponding piece of cache line data.

As described above, the data memory 16 can store a plurality of pieces of cache line data for a plurality of ways in compressed form. The tag memory 14 stores, for each piece of cache line data, a piece of tag data including flags D indicating a piece of uncompressed data writing state information, an absence flag Ab which is a piece of absence information indicating that the piece of data is absent in the data memory 16 but is valid, and a compression information field C.

Operation of the cache memory 7 will be described.

Figure 5:
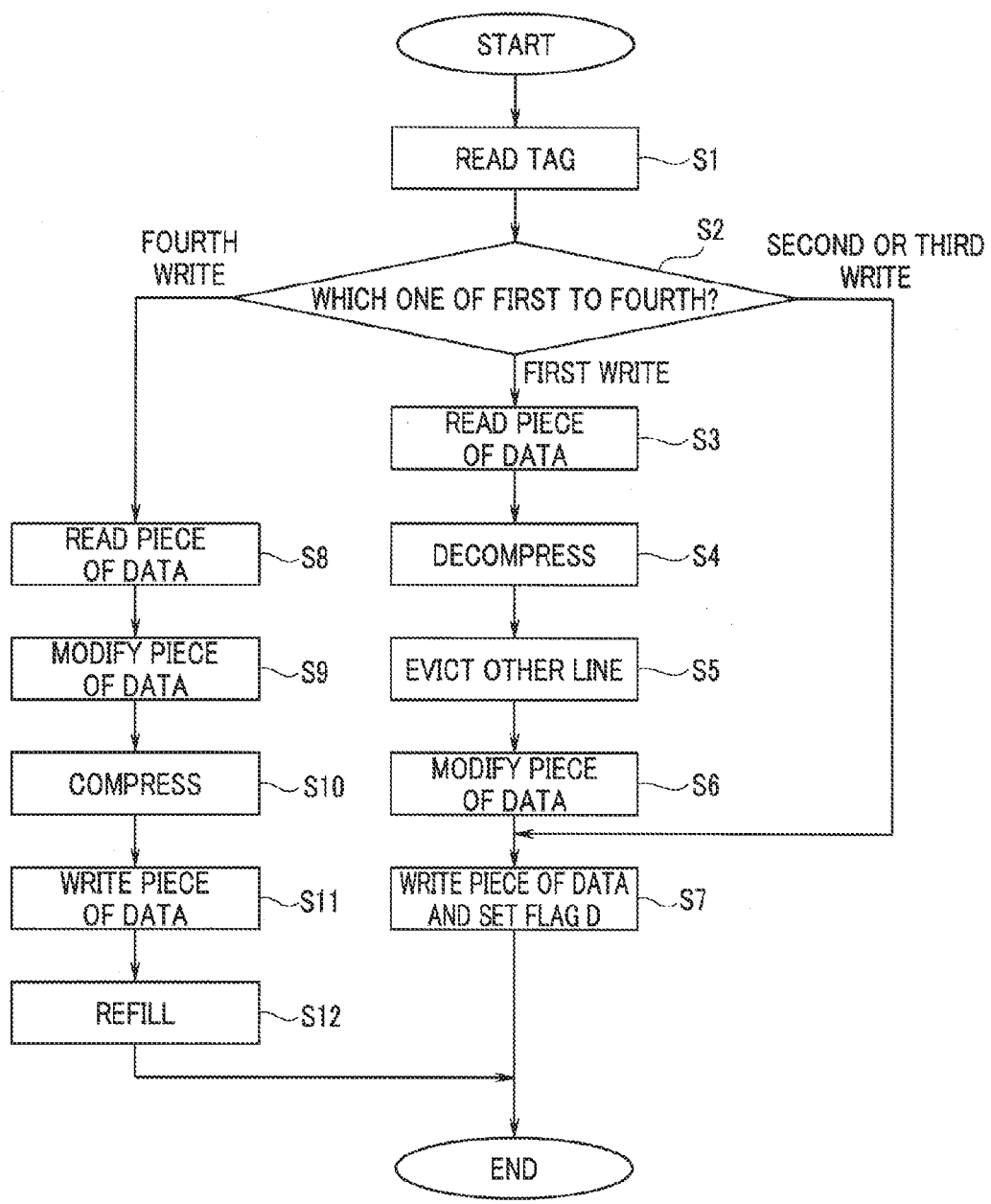
FIG. 5 is a flowchart showing a flow of a tag data and cache line data process at the time of data write of a piece of cache line data, according to an embodiment.

FIG. 5 is a flowchart showing a tag data and cache line data process at the time of write of a piece of cache line data.

Figure 6:
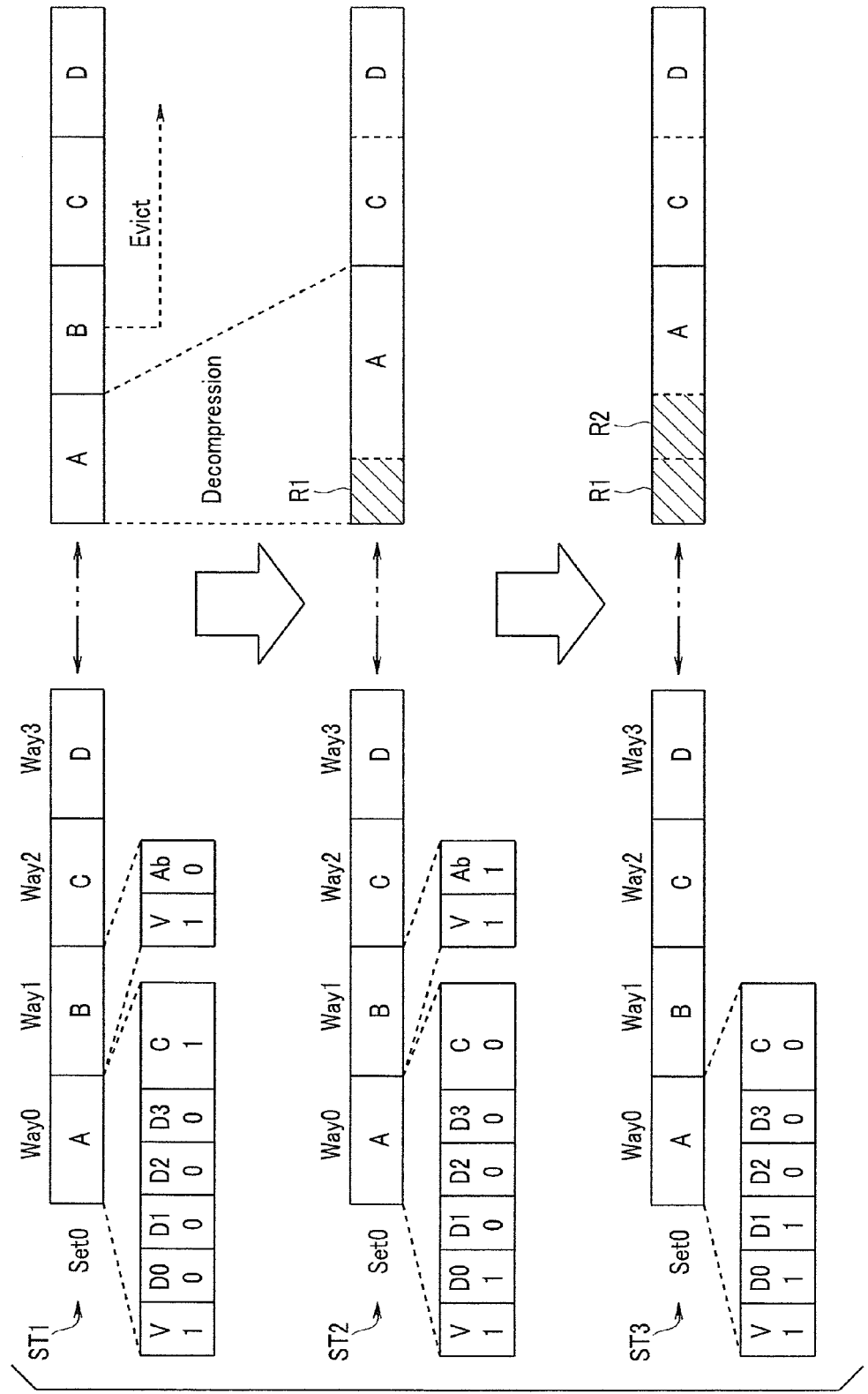
FIGS. 6 and 7 are charts for explaining transition of pieces of tag data and pieces of cache line data at the time of data write, according to an embodiment.
Figure 7:
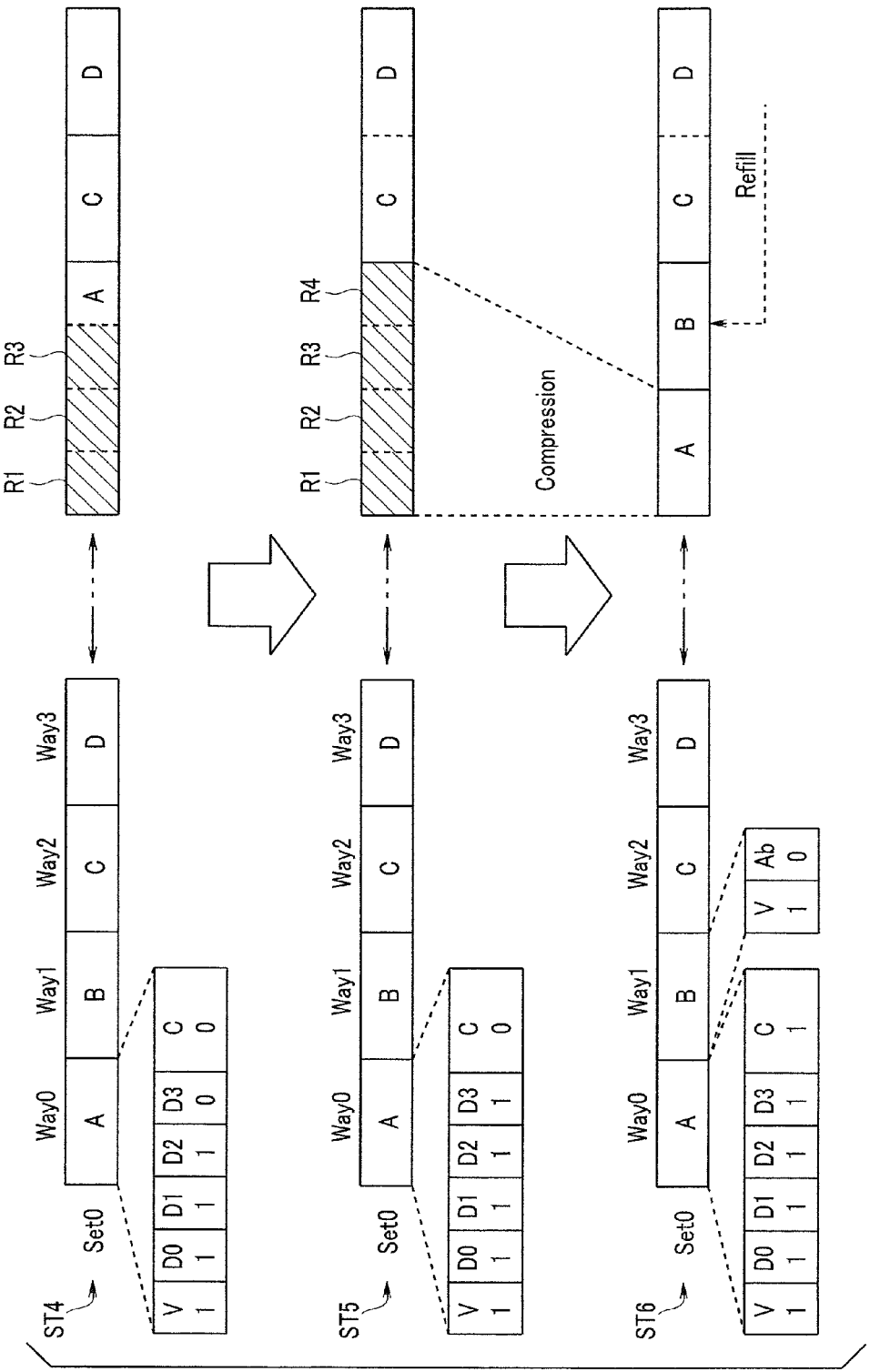

The process in FIG. 5 will be described with reference to FIGS. 6 and 7. FIGS. 6 and 7 are charts for explaining transition of pieces of tag data and pieces of cache line data at the time of write. Note that, in each of FIGS. 6 and 7, pieces of tag data (only pieces of data of some fields of which are shown) are shown on the left and pieces of cache line data are shown on the right. FIGS. 6 and 7 show a case where the cache memory 7 receives, from the CPU 2 or 3, or the HWA 5, four write requests in succession for piece A of cache line data of Set0.

Referring back to FIG. 5, if data writing from any one of the CPUs 2 and 3 and the HWA 5 occurs, a piece of tag data is read, and cache hit/miss judgment is performed (S1). If it is judged that a cache hit has occurred, an ordinal rank of the writing is judged on the basis of flags D0 to D3 in the piece of tag data (S2). In the case of data writing in a first region, it is confirmed that a piece of data as an access target is present in a target set. After the piece of data is read out (S3), the piece of data is decompressed (S4).

A piece of data in a writing target region of the decompressed piece of data is modified. Available capacity is not enough to write the decompressed piece of data without any change in the data memory 16. For this reason, a different piece of cache line data is evicted to the main memory (S5). Then, a piece of 64-byte data is modified (S6). An absence flag Ab for the evicted piece of cache line data is set to 1.

After the setting, the piece of cache line data in uncompressed form is written in the data memory 16, and a flag D0 is set to 1 (S7). The process ends.

As shown in FIG. 6, in an initial state ST1 for Set0, pieces A to D of cache line data each compressed to ½ are stored in the data memory 16. In the tag memory 14, a 1 indicating that piece A of cache line data is valid, is stored as a flag V for piece A of cache line data, 0s indicating that four pieces of 64-byte data in piece A of cache line data are all identical to a piece of data in the DRAM 8, are stored as four flags D, and a 1 indicating that piece A of cache line data is compressed, is stored as a compression information field C. Assume that a flag V for piece B of cache line data is 1, indicating that the piece of cache line data is valid, and that an absence flag Ab is 0, indicating that piece B of cache line data is stored in the data memory 16.

Note that although not shown, compression information fields C for pieces B to D of cache line data are also 1, indicating that the pieces of cache line data are compressed.

In this state, if a write request from, for example, the CPU 2 is issued for a leading piece of 64-byte data in piece A of cache line data, a result of decompressing piece A of cache line data and modifying the leading piece of 64-byte data is written in the data memory 16 without being compressed in the cache memory 7. In FIG. 6, as indicated by a state ST2, the leading piece of 64-byte data is written in a shaded region R1.

When piece A of cache line data is to be written, piece B of cache line data is evicted to a lower-level memory, such as the DRAM 8, without any modify (Evict) operation to secure available space. That is, evicted piece B of cache line data is evicted to the lower-level memory while piece B of cache line data remains a compressed piece of data.

As a result, as indicated by the state ST2 in FIG. 6, the flag D0 for the leading piece of 64-byte data in piece A of cache line data is set to 1, and the compression information field C is cleared to 0. The flag V for piece B of cache line data remains 1 indicating that the piece of cache line data is valid. Since substance of piece B of cache line data is not present in the data memory 16, the absence flag Ab is set to 1.

Referring back to FIG. 5, in the case of second or third writing on a same cache line, a compression information field C is 0. Reading and decompression of a piece of data need not be performed. A piece of data is written without any change, and a flag D1 or D2 is set to 1 (S7).

In the example in FIGS. 6 and 7, if write requests for a second piece of 64-byte data and a third piece of 64-byte data in piece A of cache line data are sequentially issued, the pieces of data are written on uncompressed piece A of cache line data in the data memory 16 without any modify operation (i.e., in uncompressed form). As indicated by a state ST3 (FIG. 6), the second piece of data is first written in a shaded region R2. As indicated by a state ST4 (FIG. 7), the third piece of data is then written in a shaded region R3. At this time, since piece A of cache line data is retained in an uncompressed state, repeated decompression and compression processing is not performed. As a result, the two writing operations set the flags D1 and D2 to 1.

Referring back to FIG. 5, in the case of fourth writing, cache hit/miss judgment is performed through reading of a piece of tag data. Simultaneously, it is checked whether any way with an absence flag Ab set to 1 is present in a target set. In the above-described example, the absence flag Ab for piece B of cache line data for Way1 is set to 1.

In this example, in the case of the fourth writing, piece A of cache line data is read out (S8), and piece A of cache line data is compressed (S10) after modification of a piece of 64-byte data (S9). The compressed piece of data is written in the data memory 16 (S11). As a result of the compression, space is available in the data memory 16. The piece of cache line data with the absence flag Ab set to 1 is read out from the lower-level memory, and a region that was an original location of the piece of cache line data is refilled with the piece of cache line data (S12). When the process in S12 ends, the four flags D are cleared to 0.

In the example in FIG. 7, if a write request is finally issued for a fourth piece of 64-byte data in piece A of cache line data, piece A of cache line data is compressed in the cache memory 7 after writing of the fourth piece of 64-byte data. Compressed piece A of cache line data is written in the data memory 16. At this time, as indicated by states ST5 and ST6, the flag D3 and the compression information field C are respectively set to 1. As a result of the compression of piece A of cache line data, space is available for a piece of cache line data in Set0. Piece B of cache line data is read out from the lower-level memory and is stored in a region that was an original location of piece B of cache line data. The absence flag Ab is cleared to 0.

Note that FIGS. 6 and 7 illustrate an example in which decompressed piece A of cache line data is stored and piece B of cache line data is evicted, in the data memory 16. To store decompressed piece B, C, or D of cache line data, piece C, D, or A of cache line data is evicted, respectively.

Note that each piece of cache line data is managed with a piece of tag data and that any piece of cache line data may be evicted as long as the piece of cache line data is compressed. For example, if a write request is issued for piece A of cache line data, piece C of cache line data may be evicted, and decompressed piece A of cache line data may be stored in regions for pieces A and C of cache line data. As described above, if writing on piece A of cache line data is performed a predetermined number of times, the compressor of the compression/decompression section 15 compresses piece A of cache line data and writes compressed piece A of cache line data in a storage region.

Note that a flag D is provided for each unit of data writing by a CPU or the like and is utilized as a dirty bit indicating an already-modified state. However, a flag D may be provided among fields separately from a dirty bit, and decompression of a piece of cache memory data (S4), compression of the decompressed piece of cache memory data (S10), and the like may be performed on the basis of the separately provided flag D.

As described above, if a piece of uncompressed data writing information for managing an update state of a decompressed piece of cache line data is additionally provided among individual fields in a piece of tag data separately from a normal dirty bit, the process in FIG. 5 can be executed regardless of a state of a dirty flag.

A pipeline configuration of the cache memory 7 that performs the process in FIG. 5 will now be described.

Figure 8:
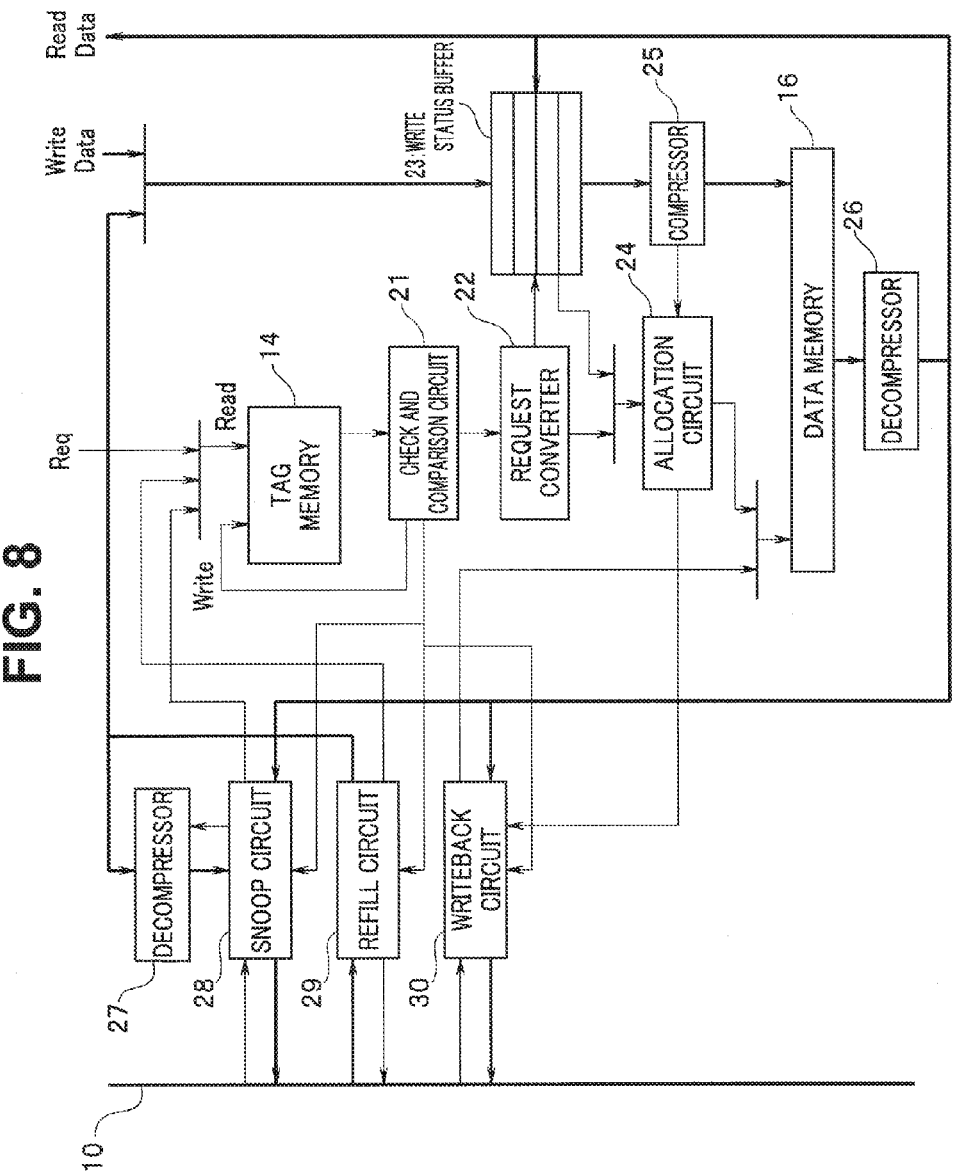
FIG. 8 is a pipeline configuration diagram of the cache memory according to an embodiment.

FIG. 8 is a pipeline configuration diagram of the cache memory 7. FIG. 8 shows the circuit-level pipeline configuration that implements the individual blocks in FIG. 2.

The cache memory 7 is configured to include a check and comparison circuit 21, a request converter 22, a write status buffer 23, an allocation circuit 24, a compressor 25, decompressors 26 and 27, a snoop circuit 28, a refill circuit 29, and a writeback circuit 30, in addition to the circuits of the tag memory 14 and the data memory 16.

When a cache request (Req) which is output in response to an access request from the master device to the DRAM 8 enters a pipeline, a piece of tag data associated with the cache request (Req) is first read out from the tag memory 14. The check and comparison circuit 21 compares the read-out piece of tag data with an address of a request destination and checks whether a piece of cache line data as the request destination is stored in the data memory 16.

That is, the check and comparison circuit 21 constitutes a judgment section which judges whether a piece of data as a write request destination is present among pieces of cache line data in the data memory 16, upon receipt of a write request.

If a piece of cache line data as a request destination is stored in the data memory 16, i.e., a cache hit occurs, the request converter 22 checks whether conversion of the request is necessary.

In a case where the request is access to modify only part of a cache line (i.e., partial write), such as the case of modifying only a piece of 64-byte data, since the piece of cache line data is compressed, readout of a piece of data of the whole cache line, such as a piece of 256-byte data, (=read-modify-write) is necessary. For this reason, at this time, the request converter 22 converts the write request into a read request, accesses the data memory 16 via the allocation circuit 24, decompresses a read-out piece of data in the decompressor 26, writes the decompressed piece of data in the write status buffer 23 together with a predetermined piece of information, and causes the write request to stand by. In the above-described example, at the time of writing of a primary piece of 64-byte data in piece A of cache line data, a write request is converted into a read request, and a piece of cache line data read out and decompressed is written in the write status buffer 23. Piece A of cache line data, part of which is updated, is written in the data memory 16.

That is, if the check and comparison circuit 21 judges that a piece of data to be written is present in piece A of cache line data in the data memory 16, piece A of cache line data is decompressed by the decompressor 26, and the piece of data to be written is written on the decompressed piece of data.

If available capacity in a storage region on the data memory 16 is less than the volume of a decompressed piece of cache line data, eviction for data saving is needed (Eviction). The allocation circuit 24 outputs a writeback request for eviction to the writeback circuit 30. In the above-described example, a writeback request for evicting piece B of cache line data is output.

That is, if available space for storing the decompressed piece of data is absent in the storage region on the data memory 16, piece B of cache line data is saved in a different memory, the DRAM 8 here. After the saving, the decompressed piece of data is written in the data memory 16.

When piece B of cache line data is saved in the different memory, the absence flag Ab for piece B of cache line data is modified to a value indicating that piece B of cache line data is not present in the data memory 16, the value being a 1 here.

In the case of modifying of only part of a cache line, a decompressed piece of data is partially modified in the write status buffer 23. After the write status buffer 23 is updated, a writing request is output to the allocation circuit 24 and the compressor 25. The updated piece of data is written in the data memory 16 after passing through the compressor 25 without processing, i.e., without being compressed. In the above-described example, at the time of writing of one of first to third pieces of 64-byte data in piece A of cache line data, a piece of data in the write status buffer 23 is written in the data memory 16 without being compressed in the compressor 25.

In the case of execution for a last write request, the compressor 25 compresses a piece of data to be written stored in the write status buffer 23 and writes the compressed piece of data in the data memory 16. When the compressed piece of data is to be written in the data memory 16, notification of a data size after the compression is given to the allocation circuit 24. The allocation circuit 24 determines in which region of the data memory 16 the compressed piece of cache line data is to be stored. In the above-described example, after four data writing operations are performed on piece A of cache line data, piece A of cache line data is compressed and is written in a region that was its original location.

In the case of a read request from a master device, new assignment of a storage region is unnecessary. The allocation circuit 24 does not perform a process of outputting a writeback request for eviction. The allocation circuit 24 accesses the data memory 16. In the case of a read request, a read-out piece of data is decompressed in the decompressor 26 to be decompressed to an original piece of data and is returned to a request source.

Note that if a cache miss occurs, the check and comparison circuit 21 makes a request to read out a piece of cache line data as an access target from outside to the refill circuit 29. Simultaneously, the check and comparison circuit 21 outputs a writeback request to the writeback circuit 30 if the data memory 16 has insufficient available space for data storage.

The snoop circuit 28 reads out a piece of tag data in the tag memory 14 in response to a request from an external cache memory and performs an action which invalidates a cache line and transmits a piece of data to a data request source.

Figure 9:
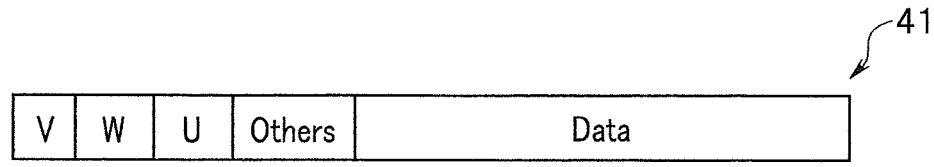
FIG. 9 is a chart showing a configuration of one piece of write status data in a write status buffer, according to an embodiment.

A data structure of the write status buffer 23 will be described. FIG. 9 is a chart showing a configuration of one piece of write status data in the write status buffer 23.

A piece 41 of write status data is a piece of data for each way in each set. Thus, the write status buffer 23 includes a plurality of pieces 41 of write status data.

The piece 41 of write status data includes a valid flag (V), a wait flag (W), an uncompressed writing flag (U), other state flags (Others), and a piece of data (Data).

The valid flag (V) is a flag indicating whether a piece of data to be written is valid. After the piece of data is written in the data memory 16, the piece of data is invalidated.

The wait flag (W) is a bit indicating that a write request is on standby if a read request is required for partial writing of a piece of cache line data.

The uncompressed writing flag (U) is a bit indicating that writing in an uncompressed state is to be performed. When the flag U is on, the compressor 25 does not compress a piece of data. Thus, the piece of data is written in the data memory 16 without being compressed.

A piece of data to be written is written in the piece of data (Data). Alternatively, when a piece of data is read out from the data memory 16 in response to a read request for partial writing of a piece of cache line data, the read-out piece of data is written in the piece of data (Data).

Processing by the request converter 22 will now be described in detail.

Figure 10:
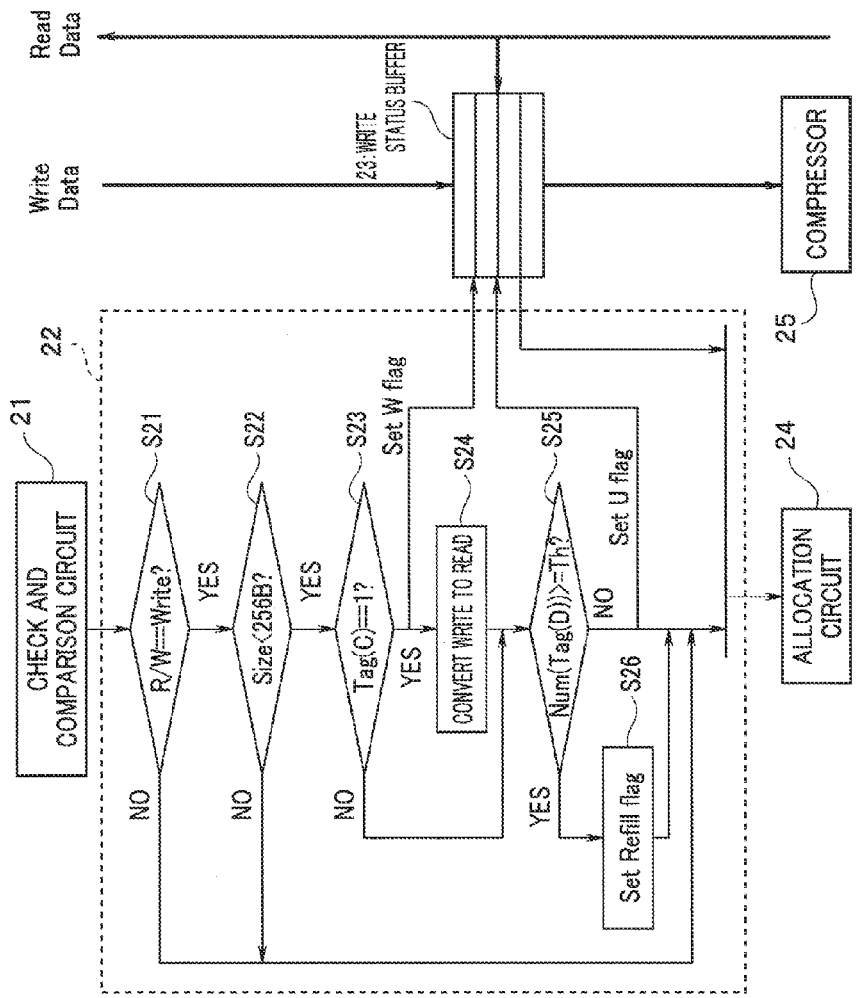
FIG. 10 is a chart for explaining details of processing by a request converter, according to an embodiment.

FIG. 10 is a chart for explaining details of the processing by the request converter 22. In FIG. 10, the processing by the request converter 22 is indicated by a flowchart and is implemented by circuits.

The request converter 22 judges details of a request from the check and comparison circuit 21 and judges content of a piece of tag data in accordance with the details of the request. If the request is a write request (YES in S21), and size of a piece of data to be written is less than a cache line size (YES in S22), the request converter 22 then judges whether a compression information field C in the piece of tag data is "1" (S23).

If the compression information field C is "1" (YES in S23), the request is for first writing, and a piece of data is compressed. The request converter 22 notifies the write status buffer 23 to set a wait flag W to 1 indicating that writing is on standby and converts the request into a read request (S24).

If the compression information field C is not "1" (NO in S23), the request is for second, third, or fourth writing, and the request converter 22 does not convert the request into a read request.

The request converter 22 judges whether the number of flags D with a value of 1 is not less than a predetermined threshold Th (S25). The number of flags D here is the number of flags D with a value of 1 with data modification in accordance with an input request in mind.

If the total number of flags D with a value of 1 is less than the predetermined threshold Th (NO in S25), the request converter 22 requests of the write status buffer 23 that an uncompressed writing flag U be set to 1 indicating that the piece of data to be written is not compressed.

If the flag U is 1, the compressor 25 does not compress a piece of data, and a piece of uncompressed data is written in the data memory 16. In the example in FIGS. 6 and 7, the threshold Th is 4, and a piece of data to be written is not compressed in each of first access to third access.

Note that an evicted piece of cache line data passes through the decompressor 26 in a compressed state and is written back to an external memory, the DRAM 8 here, via the interconnect 10 by the writeback circuit 30.

If the total number of flags D with a value of 1 is not less than the predetermined threshold Th (YES in S25), the request converter 22 requests of the write status buffer 23 that a refill flag which is referred to by the refill circuit 29 be set to 1. In the example in FIGS. 6 and 7, YES is obtained in S25 in the case of fourth access.

If the refill flag is 1, a region emptied after compression is refilled with a piece of cache line data in an absent state by the allocation circuit 24 and the refill circuit 29.

As described above, if the compressor 25 writes compressed piece A of cache line data, writeback of piece B of cache line data saved in a different memory is performed. The absence flag Ab for piece B of cache line data is modified to a value indicating that piece B of cache line data is present in a storage region for piece B of cache line data.

(Read Request Process for Evicted Piece of Cache Line Data from Different Master)

When a piece of uncompressed data is to be written in the data memory 16, a predetermined piece of cache line data, piece B of cache line data in the above-described example, is temporarily evicted to a lower-level memory, the DRAM 8 here. When the piece of uncompressed data in the data memory 16 is compressed, the evicted piece of cache line data is written back to the data memory 16 by refill processing.

However, before refilling with an evicted piece of cache line data, a read request for the evicted piece of cache line data may be issued from a different master device. A process in a case where a read request from a different master device is made for a piece of cache line data evicted to a lower-level memory will be described below.

Figure 11:
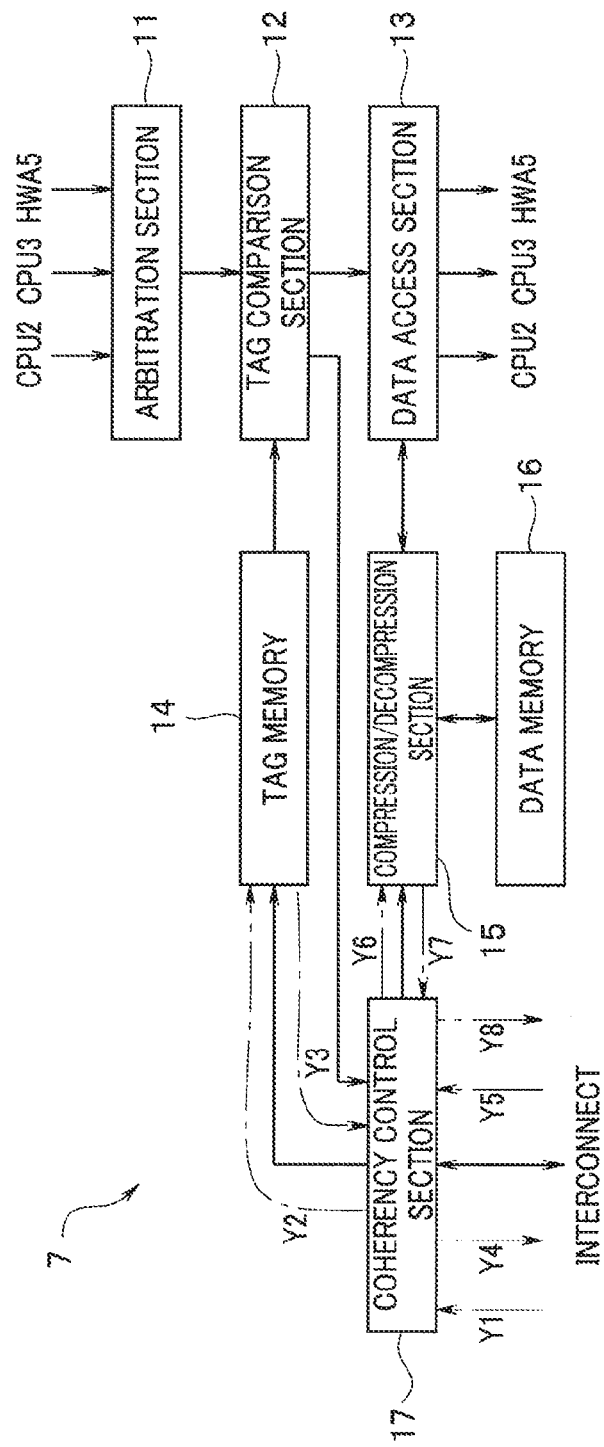
FIG. 11 is a block diagram showing the schematic configuration of the cache memory, which shows a data flow in a case where a data read request is issued from a different master device (a CPU or a graphics processing unit (GPU)) which does not share the cache memory, according to an embodiment.

FIG. 11 is a block diagram showing the schematic configuration of the cache memory 7 that shows a data flow in a case where a read request from a different master device which does not share the cache memory 7 is issued for a cache line with an absence flag Ab set to 1.

With the cache coherency system, the read request is input to the coherency control section 17 (Y1). The coherency control section 17 reads out a piece of tag data for a piece of cache line data associated with the read request from the tag memory 14 (Y2).

The coherency control section 17 judges, from an absence flag Ab in the read-out piece of tag data, that the piece of cache line data in question is absent, i.e., is in an absent state (Y3).

Since substance of the piece of cache line data in question is absent in the data memory 16, the coherency control section 17 makes a data request to the DRAM 8 (Y4) and receives the compressed piece of cache line data in question (Y5).

The coherency control section 17, i.e., the snoop circuit 28 sends the received piece of cache line data to the decompressor 27, uses the decompressor 27 to perform decompression (Y6), and acquires a piece of uncompressed cache line data (Y7).

Note that the received piece of cache line data may be sent to the decompressor 26 and be decompressed, and a piece of uncompressed data may be acquired.

The coherency control section 17 returns the piece of uncompressed data to a request source (Y8).

As described above, upon receipt of a read request for a piece of cache line data saved in a different memory, the coherency control section 17 acquires the piece of cache line data from the different memory, decompresses the piece of cache line data, and sends the decompressed piece of cache line data to a request source. Decompression of a piece of cache line data may be performed by the decompressor 26 or may be performed by the different decompressor 27.

Thus, if the cache memory 7 writes an already-compressed piece of data back to the DRAM 8, even when a read request is made from a master device without a decompressor, a decompressed piece of data can be returned. With the above-described mechanism, it is possible to write a piece of cache line data in an absent state back to the DRAM 8 while keeping the piece of cache line data compressed. As a result, a reduction in DRAM bandwidth and a reduction in latency at the time of eviction of and refilling with a piece of cache line data can be implemented.

An example has been described above in which four pieces of 64-byte data in one piece of cache line data are modified in succession. If all pieces of data in the one piece of cache line data are not modified in succession, the one piece of cache line data is retained in the data memory 16 while being kept uncompressed until the four pieces of data are modified.

Note that if modifying of all pieces of data in one piece of cache line data is not performed, passage of a predetermined time period may be measured by a timer. If it is judged that the predetermined time period has elapsed, a piece of uncompressed data retained at the time may be compressed and be written in the data memory 16.

As has been described above, a cache device according to the present embodiment temporarily retains a piece of uncompressed data in a cache memory when part of a piece of cache line data is to be modified, which eliminates a need for decompression and compression for every writing operation of a piece of partial data. It is thus possible to reduce latency involved in decompression and compression and power consumption.

In particular, in related art, a piece of target data needs to be read out once from a data memory for decompression and compression processing. In the present embodiment, in the above-described example, a second round of processing (writing) and a third round of the processing (writing) do not need readout of a piece of data from a data memory. That is, data decompression, updating, and compression for every data modifying operation are not performed. A cache device according to the present embodiment can reduce latency and reduce power consumption.

As a result, it is possible to reduce power by reducing a bandwidth of a cache device, and improve throughput of the cache device by diverting a decrease in bandwidth to handling of a request from a different master device.

Additionally, a cache hit ratio can be increased by keeping a piece of tag data for a piece of cache line data evicted for available space securement retained in a tag memory at the time of temporary retention of a piece of uncompressed data in a data memory and performing refilling again after cache line update processing ends.

Note that although a piece of cache line data to be temporarily evicted is stored in a DRAM while being left compressed in the above-described embodiment, the piece of data may be decompressed and stored as a piece of uncompressed data in the DRAM. Upon receipt of a read request from a different master device in the case, the coherency control section 17 can transmit a piece of uncompressed data read out from a DRAM to a request source without any change.

While certain embodiments have been described, these embodiments have been presented by way of example only, and are not intended to limit the scope of the invention. Indeed, the novel systems and devices described herein may be embodied in a variety of other forms; furthermore, various omissions, substitutions and modifications to the form of the systems and devices described herein may be made without departing from the spirit of the invention. The accompanying claims and their equivalents are intended to cover such forms or modifications as would fall within the scope and spirit of the invention.

What is claimed is:

1. A cache device comprising:
a data memory configured to store a piece of first cache line data and a piece of second cache line data for first and second ways in compressed form;
a tag memory configured to store, for each of the pieces of cache line data, a piece of tag data including a piece of uncompressed data writing state information, a piece of absence information, and a piece of compression information;

a first decompressor; and
a judgment section configured to judge, upon receipt of a write request from a master device connected to the cache device, whether a piece of data to be written associated with the write request is present in the piece of first cache line data,
wherein if the judgment section judges that the piece of data to be written is present in the piece of first cache line data, the piece of first cache line data is decompressed by the first decompressor, the piece of data to be written is written on the decompressed piece of data, and the piece of data to be written after the writing on the decompressed piece of data is compressed and stored in the data memory.

2. The cache device according to claim 1, wherein if available space enough to store the decompressed piece of data is absent in a storage region for the piece of first cache line data, the decompressed piece of data is written across the storage region for the piece of first cache line data and a storage region for the piece of second cache line data after the piece of second cache line data is saved in another memory.

3. The cache device according to claim 2, wherein when the piece of second cache line data is saved in the other memory, the piece of absence information for the piece of second cache line data is modified to a value indicating that the piece of second cache line data is not present in the data memory.

4. The cache device according to claim 3, further comprising:
a compressor,
wherein when writing of the piece of data to be written on the piece of first cache line data is performed a predetermined number of times, the compressor compresses the decompressed piece of data and writes the compressed piece of data in the storage region for the piece of first cache line data.

5. The cache device according to claim 4, wherein when the compressor writes the compressed piece of first cache line data in the storage region for the piece of first cache line data, the piece of second cache line data saved in the other memory is written back to the storage region for the piece of second cache line data, and the piece of absence information for the piece of second cache line data is modified to a value indicating that the piece of second cache line data is present in the data memory.

6. The cache device according to claim 2, further comprising:
a coherence control section configured to, upon receipt of a read request for the piece of second cache line data saved in the other memory, obtain the piece of second cache line data from the other memory, decompress the piece of second cache line data obtained from the other memory, and transmit the decompressed piece of second cache line data to a request source of the read request.

7. The cache device according to claim 6, further comprising:
a second decompressor configured to decompress the piece of second cache line data.

8. The cache device according to claim 6, wherein the decompression of the piece of second cache line data is performed by the first decompressor.

9. The cache device according to claim 1, wherein the piece of uncompressed data writing state information comprises a dirty bit indicating whether or not a corresponding piece of cache line data has been modified.

10. A semiconductor device comprising:
a central processing unit (CPU); and
a cache device,
wherein the cache device comprises:
a data memory configured to store a piece of first cache line data and a piece of second cache line data for first and second ways in compressed form; and
a tag memory configured to store, for each of the pieces of cache line data, a piece of tag data including a piece of uncompressed data writing state information, a piece of absence information, and a piece of compression information,
wherein the semiconductor device further comprises:
an interconnect connected to the cache device;
a first decompressor provided in the cache device; and
a judgment section provided in the cache device and configured to judge, upon receipt of a write request from the CPU, whether a piece of data to be written associated with the write request is present in the piece of first cache line data, and
wherein if the judgment section judges that the piece of data to be written is present in the piece of first cache line data, the piece of first cache line data is decompressed by the first decompressor, the piece of data to be written is written on the decompressed piece of data, and the piece of data to be written after the writing on the decompressed piece of data is compressed and stored in the data memory.

11. The semiconductor device according to claim 10, wherein if available space enough to store the decompressed piece of data is absent in a storage region for the piece of first cache line data, the cache device writes the decompressed piece of data across the storage region for the piece of first cache line data and a storage region for the piece of second cache line data after the cache device saves the piece of second cache line data in another memory via the interconnect.

12. The semiconductor device according to claim 11, wherein when the piece of second cache line data is saved in the other memory, the piece of absence information for the piece of second cache line data is modified to a value indicating that the piece of second cache line data is not present in the data memory.

13. The semiconductor device according to claim 12, further comprising:
a compressor provided in the cache device,
wherein when writing of the piece of data to be written on the piece of first cache line data is performed a predetermined number of times, the compressor compresses the decompressed piece of data and writes the compressed piece of data in the storage region for the piece of first cache line data.

14. The semiconductor device according to claim 13, wherein when the compressor writes the compressed piece of first cache line data in the storage region for the piece of first cache line data, the piece of second cache line data saved in the other memory is written back to the storage region for the piece of second cache line data, and the piece of absence information for the piece of second cache line data is modified to a value indicating that the piece of second cache line data is present in the data memory.

15. The semiconductor device according to claim 11, further comprising:
a coherence control section provided in the cache device and configured to, upon receipt of a read request for the piece of second cache line data saved in the other memory, obtain the piece of second cache line data from the other memory, decompress the piece of second cache line data acquired obtained from the other memory, and transmit the decompressed piece of second cache line data to a request source of the read request.

16. The semiconductor device according to claim 15, further comprising:
a second decompressor provided in the cache device and configured to decompress the piece of second cache line data.

17. The semiconductor device according to claim 15, wherein the decompression of the piece of second cache line data is performed by the first decompressor.

18. The semiconductor device according to claim 10, wherein the piece of uncompressed data writing state information comprises a dirty bit indicating whether or not a corresponding piece of cache line data has been modified.

* * * * *